Aug. 30, 1955
J. B. WATTS
2,716,424
HOT AND COLD WATER MIXING VALVES
Filed Dec. 26, 1951
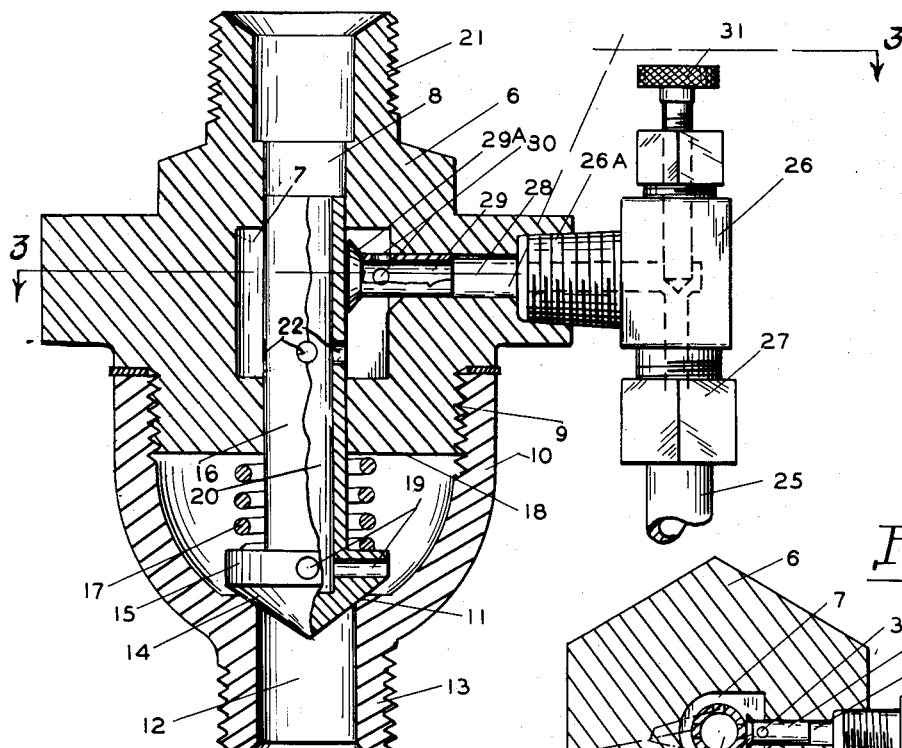
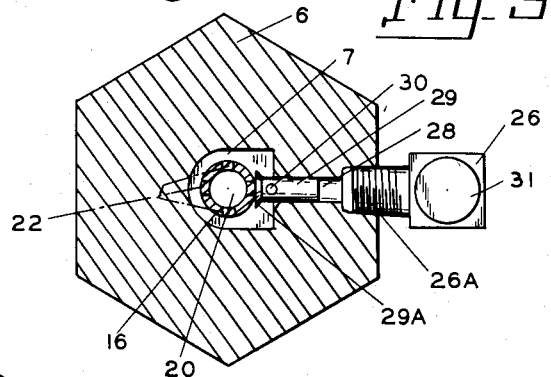
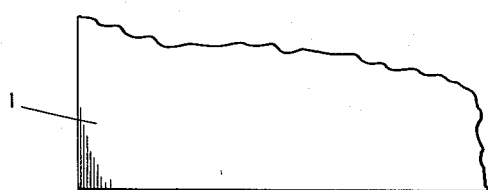
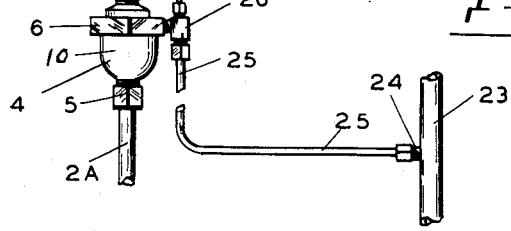
INVENTOR.
JAMES B. WATTS
BY
ATTY.

2,716,424
HOT AND COLD WATER MIXING VALVES

James B. Watts, Clatskanie, Oreg., assignor to Watts Manufacturing Company, a corporation of Oregon Application December 26, 1951, Serial No. 263,361

6 Claims. (Cl. 137—512)

This invention relates to hot and cold water mixing valves and is particularly adapted to be used in connection with water closet tanks.

The primary object of the invention is to prevent the sweating of water closet tanks by admitting warmed water into the tank by way of my new and improved hot and cold water mixing valve.

A further object of my new and improved hot and cold water mixing valve is that it is so designed as to be easily installed within the water supply pipe leading to the lavatory tank.

A still further object is to supply a mixture of water having controlled temperature to a closet flush tank every time that it is automatically refilled, after being dumped.

These and other incidental objects will be apparent in the drawings, specification and claims.

Referring to the drawings:

Figure 1 illustrates a fragmentary view of a water closet tank, having my new and improved hot and cold water mixing valve installed within the water supply pipe leading into the tank.

Figure 2 is a sectional view of my new and improved mixing valve, parts broken away for convenience of illustration.

Figure 3 is a plan sectional view, taken on line 3—3 of Figure 2.

Referring more specifically to the drawings:

The conventional water closet tank is indicated by numeral 1 having the usual water supply tubing 2 connected to the float valve located within the tank by way of the stuffing box 3. My valve is generally indicated by numeral 4 and may be inserted within the pipe 2 by cutting away a portion of the said pipe and inserting my valve 4 by way of the usual stuffing box connections 5.

My new and improved hot and cold water mixing valve consists of a body 6, being cored out at 7 and having an accurately machined or ground cylindrical opening 8 running longitudinally of the body of the valve, communicating with the cored out portion 7. Threadably connected to the body 6 at 9 of the valve is a hollow bowl or shell 10.

Located in the bottom of this bowl is a valve seat 11, which communicates with the opening 12 of the stuffing box connection 13, which receives the pipe 2 of the cold water line supply. Closing the valve seat 11 is a valve 14. This valve 14 consists of an enlarged head 15, having a hollow stem 16 forming part thereof. The stem 16 is adapted to work in the cylindrical opening 8 of the body 6 of the valve with a precision fit.

The valve 14 is normally seated on the valve seat 11 by the spring 17, one of whose ends rest on the enlarged head 15, and its opposite end bearing against the underside of the valve body 6 at 18. Ports 19 communicate with the interior 20 of the valve stem 16. When the flushing valve within the water closet tank is opened, the float valve within the tank will open reducing the pressure within my valve.

The water pressure then from the pipe 2 below my valve will force the enlarged head 15 of the valve 14 away from its seat 11 against the spring 17, allowing the incoming cold water to enter the bowl 10, thence into the valve stem 16 by way of the ports 19, up through the pipe 2 and through the float valve within the tank, filling the tank. When this happens hot water will be admitted from a hot water pipe 23, fitting 24, tubular pipe 25, leading to the needle valve 26 at 27. Water will pass through the needle valve into the cylindrical passageway 27, through the ports 30 of the floating valve 29 and out into the cored out portion 7 by way of the ports 30 located within the stem of the said valve.

This hot water mixes within the cold water stream passing through the stem 16 of the valve 14 in the desired proportion to warm the water supply going into the tank 1 so as to prevent sweating of the tank. This amount is adjusted by the needle valve thumb nut 31.

In the event that the water pressure within the hot water line 23 is reduced by drawing hot water from other fixtures connected to the hot water line 23, the opening of the valve 14 in regards to its seat 11 is prevented by the closing of the ports 30 of the valve 29. The reduced pressure within the passageway 28 permits a greater pressure in the cored out portion to force the valve 29 into the passageway closing the said ports 30. This valve will immediately open to the position shown in the drawings in the event the flush valve within the lavatory is opened. If it were not for the valve 29, cold water would be bled through the valve 14 due to the fact that the pressure within the water supply line 2A would be greater than that within the hot water pipe line 23, therefore it would tend to unseat the valve 14, but when this tendency takes place the valve 29 is forced into the space 28 closing the ports 30 until the pressure is equalized, then when the lavatory valve is flushed the pressure will be reduced within the cored out portion 7 and the base of the bowl above the valve 14. This will tend to cause the valve 29 to return to the position shown in the drawings so that warm water can be entered into the cold water stream.

The mode of operation of this invention will now be described. The new structure herein with its new mode of operation and novel result depends on the valve 14, with its spring load by the spring 17, which in practice exerts a spring pressure against the valve seat 11, by the valve 14 of about ten pounds per square inch, to all intents and actually makes it a pressure reducing valve, reducing the water pressure above it (see Fig. 2) save for the presence of the hot water supply above it, to ten pounds less than that normally present in the pipe 2A. When the tank 1 is dumped, as such tanks are dumped it will contain practically zero water pressure as will the passageway 8 leading to it for immediate refill, the valve 14 will open promptly and concurrently the non-return valve 29 will likewise open if closed, having the pressure advantage afforded it by the reduced pressure admitted by way of valve 14 and its seat 11. It follows as a law of hydromechanics that as the float valve control within the tank 1 gradually chokes against the combined water flow, the valve 14 will close first because of pressure balance on top of the valve plus spring load, but the last small quantity of water necessary to completely cause float valve closure will come from the pipe 25, which gets its pressure from a common source of supply. This must be so for without a common pressure supply the whole apparatus is useless.

The non-return valve, as so far described, will be left open and tends to remain indefinitely in the position shown in Fig. 2; but use of hot water from the pipe 23 for other purposes will cause static pressure to change into velocity and the pressure tends to lower throughout the main structure of Fig. 2. Since the bowl space above the valve 14 is in open communication through the pipe 25, the chamber 8 and the various ports such as 19, the tendency is for pressure to lower in all of these spaces above the valve 14. Since the very nature of a float valve prevents any water from coming backwards from the tank 1 once the tank is filled, and the fact that water is incompressible, no dynamic energy but only potential energy is stored in the spaces enumerated; but, if the pressure falls below the ten pound per square inch differential of the valve 14, it will leave its seat 11 and admit the exceedingly small amount of water necessary to close the non-return valve 29 by pressure against its head 29A which as shown in Fig. 3 is a flat surface normally abutting the cylindrical surface of the tubular member 16 and having but a line contact therewith.

Since it is admittedly objectionable to have reverse water movement into the hot water system from the closet supply, it is seen that I have circumvented that tendency by arranging the non-return valve 29 to close communication by the slightest tendency of reverse flow and due to the, theoretically at least, slower response of the valve 14, it will be immediately open to its operative position when the tank 1 is dumped. Other types of non-return valves may be substituted without departing from the spirit of the invention, but the entire omission of the valve 14 or its mechanical equivalent will result in complete failure of device as a whole.

What I claim is:

1. A valve for supplying heated water to the water supply of a tank, comprising a body portion formed with a chamber and a central bearing opening, the bearing opening communicating with the upper and lower ends of the chamber, a bowl secured to the bottom of the body portion, said bowl having a valve seat at its lower end, a valve head normally seated on the valve seat, a hollow stem on the valve head, said stem extending through the chamber and slidingly mounted in the bearing opening, said stem having ports in communication with the chamber, ports formed in the valve head to provide communication between the bowl and the hollow stem, a spring for normally seating the valve head on its seat, means for supplying cold water to the bowl below the valve head, means communicating with the chamber for introducing hot water thereto, said means including a hollow slidable valve formed with a port normally in communication with the chamber, the hollow valve being held in open position by the pressure of cold water passing through the hollow stem when the valve head is raised from its seat to supply water to a tank and the pressure of hot water in the hollow valve, and closed when the pressure of hot water in the hollow valve is less than the pressure of the cold water, when the valve head is seated.

2. A valve for supplying heated water to a tank, as defined in claim 1, wherein the means for introducing hot water to the chamber includes a needle valve, and means for controlling the needle valve.

3. A valve for supplying heated water to the water supply of a tank, comprising a body portion formed with a chamber and a central bearing opening, the bearing opening communicating with the upper and lower ends of the chamber, a bowl secured to the bottom of the body portion, said bowl having a valve seat at its lower end, a valve head normally seated on the valve seat, a hollow stem on the valve head, said stem extending through the chamber and slidingly mounted in the bearing opening, said stem having ports in communication with the chamber, ports formed in the valve head to provide communication between the bowl and the hollow stem, a spring for normally seating the valve head on its seat, means for supplying cold water to the bowl below the valve head, the body portion having an opening communicating with the chamber, a needle valve casing formed with a passage which communicates with the opening to introduce hot water to said opening, means for supplying hot water to the casing, a needle valve in the passage to control the flow of hot water, a hollow valve slidably mounted in the opening, said hollow valve having a head which when in open position abuts against the hollow stem, ports formed in the hollow valve to permit flow of hot water from the passage to the chamber when said valve is in open position, whereby when the valve head is raised from its seat, cold water will flow through the ports in the valve head to the hollow stem, the suction of the water drawing a supply of water from the chamber through the ports in the stem, said hollow valve closing when the pressure of the hot water supply is diminished.

4. A valve for supplying heated water to the water supply of a tank, comprising a body portion formed with a chamber and a central bearing opening, the bearing opening communicating with the upper and lower ends of the chamber, a bowl secured to the bottom of the body portion, said bowl having a valve seat at its lower end, a valve head normally seated on the valve seat, a hollow stem on the valve head, said stem extending through the chamber and slidingly mounted in the bearing opening, said stem having ports in communication with the chamber, ports formed in the valve head to provide communication between the bowl and the hollow stem, a spring for normally seating the valve head on its seat, means for supplying cold water to the bowl below the valve head, a hot water supply pipe communicating with the chamber, and a needle valve for controlling the supply of hot water.

5. A valve for supplying heated water to the water supply of a tank, comprising a body portion formed with a chamber and a central bearing opening, the bearing opening communicating with the upper and lower ends of the chamber, a bowl secured to the bottom of the body portion, said bowl having a valve seat at its lower end, a valve head normally seated on the valve seat, a hollow stem on the valve head, said stem extending through the chamber and slidingly mounted in the bearing opening, said stem having ports in communication with the chamber, ports formed in the valve head to provide communication between the bowl and the hollow stem, a spring for normally seating the valve head on its seat, means for supplying cold water to the bowl below the valve head, means including a sliding valve having inlet ports, normally in communication with the chamber, a hot water supply pipe communicating with the hollow valve, pressure of the supply of hot water normally opening the valve to permit passage of hot water to the chamber, diminishing pressure of the hot water acting on the hollow valve to close the ports when the valve head is closed on its seat, suction by passage of cold water through the stem when the valve head is lifted from its seat opening the hollow valve to introduce hot water to the chamber.

6. In a mixing valve for supplying arranged portions of warm with other portions of cold water, a valve body, an inner valve seat in said body, a spring loaded pressure reducing valve positioned to bear against said seat under influence of said spring to reduce the pressure of water delivered through said valve seat to a desired amount below that of the water supply, a water chamber within which said valve and spring are positioned, a warm water supply means in normal communication with said chamber from a water warming device supplied from a water supply that is common to both warm and cold water devices and non-return valve means for preventing reverse flow into said warm water supply means.

References Cited in the file of this patent

UNITED STATES PATENTS

| | | |
|---|---|---|
| 154,544 | Doten | Sept. 1, 1874 |
| 1,302,844 | Pepler | May 6, 1919 |

FOREIGN PATENTS

| | | |
|---|---|---|
| 8,444 | Great Britain | 1895 |
| 97,451 | Austria | July 10, 1924 |